United States Patent [19]

Savage

[11] 4,175,516
[45] Nov. 27, 1979

[54] PET FEEDING DEVICE

[76] Inventor: Richard T. Savage, Greenlake Ave., Leeds, N.Y. 12451

[21] Appl. No.: 837,609

[22] Filed: Sep. 28, 1977

[51] Int. Cl.² ............................................. A01K 1/10
[52] U.S. Cl. ...................................................... 119/62
[58] Field of Search .......................................... 119/62

[56] References Cited

U.S. PATENT DOCUMENTS

| 101,766 | 4/1870 | Richardson | 119/62 X |
|---|---|---|---|
| 1,287,867 | 12/1918 | Bryant | 119/62 |
| 2,933,063 | 4/1960 | Geerlings | 119/62 X |
| 3,121,419 | 2/1964 | Gillespie | 119/62 |
| 3,176,656 | 4/1965 | Bates | 119/62 |

FOREIGN PATENT DOCUMENTS 472801 9/1937 United Kingdom ...................... 119/62

*Primary Examiner*—Louis G. Mancene
*Assistant Examiner*—Daniel J. Leach
*Attorney, Agent, or Firm*—Charles J. Brown

[57] ABSTRACT

A pet feeding device having a pedal portion which when depressed by the pet causes a lid unit to swing open to uncover a food receptable, incorporating an improved simplified linkage which minimizes the effort required to operate the pedal.

1 Claim, 4 Drawing Figures

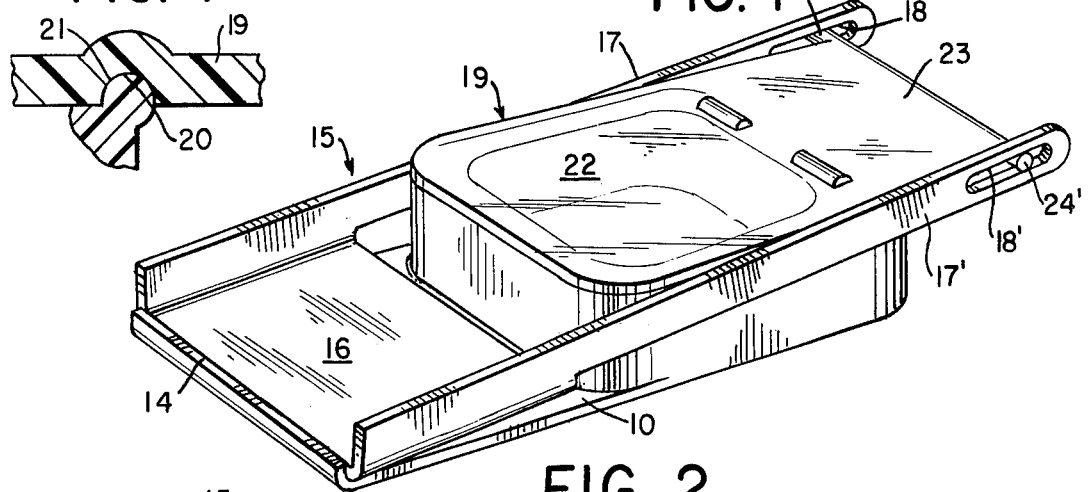
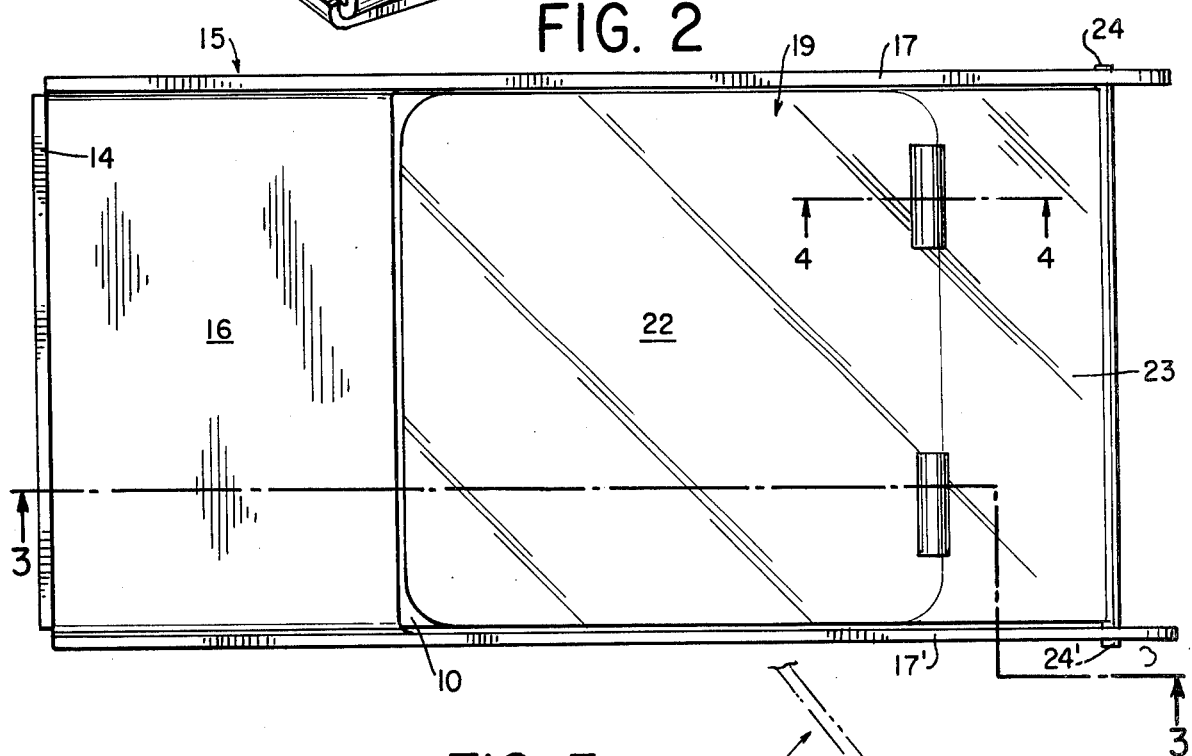
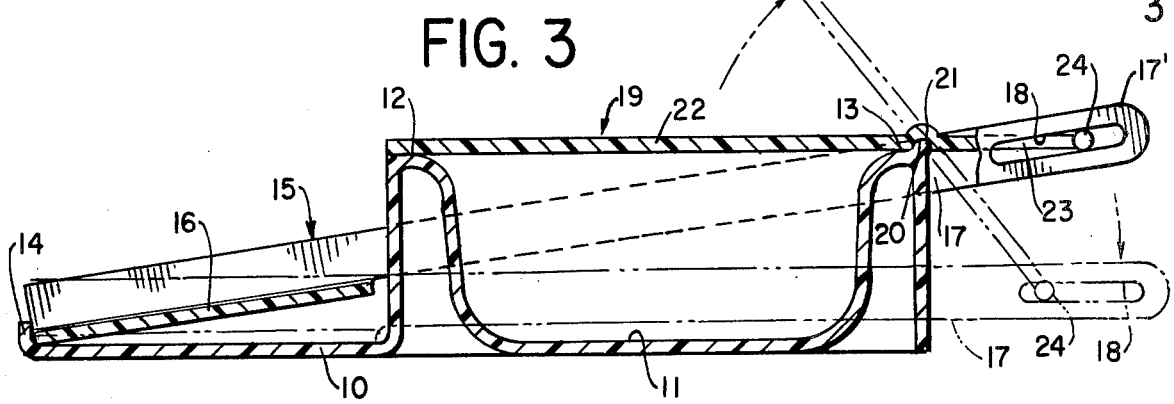

PET FEEDING DEVICE

BACKGROUND OF THE INVENTION

1. Field of the Invention

This invention relates to pet-operated closeable feeding devices and, more particularly, to a feeding device having a pedal portion which operates a lid unit covering a food receptacle through a linkage constructed so that the operating force required on the pedal reduces as the lid unit moves from closed to open position.

2. Description of the Prior Art

U.S. Pat. Nos. 3,176,656 and 3,121,419 are representative of the prior art upon which the improvement of the present invention has been made. Each discloses a pedal device which operates a lid unit to cover and uncover a food receptacle, the former through a cam-type operation which forces the lid over dead center and back by an elastic band and the latter through a multiple-link hinge action in which the lid closes by gravity. Such devices are not of optimum design for small pets and particularly cats because the downward force required on the pedal to open the lid unit is not minimized to the extent it could be. No structures of the prior art have incorporated simplified linkage means wherein critical moment arms actually decrease in length as the lid moves from closed to open position, thus increasing the mechanical advantage achieved by the pedal and rendering the opening operation relatively smooth and effortless. It is the object of this invention to provide such a structure.

SUMMARY OF THE INVENTION

The invention provides a pet-operated closeable feeding device comprising a frame and an open food receptacle on the frame. The receptacle has forward and rearward edge portions. An actuator unit is pivotably mounted on the frame forward of the forward edge portion of the food receptacle. The actuator unit comprises a pedal portion disposed between the pivotable mounting of the actuator unit and the forward edge portion of the food receptacle. At least one arm portion extends from the pedal portion rearwardly beyond the rearward edge portion of the food receptacle. A lid unit is pivotably mounted on the frame adjacent the rearward edge portion of the food receptacle. The lid unit comprises a cover portion adapted to overlie the food receptacle when said lid unit is in closed position, and an end portion which extends rearwardly beyond the rearward edge portion of the food receptacle and having a surface in slideable contact with a surface of the actuator unit arm portion.

The object of this invention achieved by the foregoing structure is that a downward turning force on the pedal portion causes the lid unit cover portion to pivot upwardly to an open position while the point of sliding contact between the lid unit end portion and the actuator unit arm portion moves forwardly toward the pivotable mounting of the actuator unit. In this manner the force on the pedal portion necessary to continue opening the cover portion of the lid unit reduces progressively as the cover portion moves toward its open position.

In a preferred form of the invention the actuator unit includes a pair of parallel arm portions extending from the pedal portion rearwardly to each side of and beyond the rearward edge portion of the food receptacle and a longitudinal slot is formed in each of the arm portions. The end portion of the lid unit includes a pair of coaxial opposed trunnions extending outwardly in slideable contact with these respective slots.

The device of the invention consists of easily made parts which are simple and few in number.

Other objects and advantages of the invention will become apparent from the following description taken in conjunction with the accompanying drawing.

BRIEF DESCRIPTION OF THE DRAWING

FIG. 1 is a perspective view of the device of the invention with the lid unit in closed position;

FIG. 2 is a top plan view of the device of FIG. 1;

FIG. 3 is a section taken along the line 3—3 of FIG. 2 showing the lid unit both in open and closed positions; and FIG. 4 is an enlarged fragmentary section taken along the line 4—4 of FIG. 2.

DESCRIPTION OF PREFERRED EMBODIMENT

The pet-operated closeable feeding device of the invention includes a frame 10 preferably of one-piece moulded plastic. An integral food receptacle 11 is formed in fixed relation with said frame and includes what may be designated as a forward edge portion 12 and a rearward edge portion 13. It is to be understood that either solid or liquid foods or water may be placed in the receptacle 11 either directly or in appropriate removable containers or dishes. An upwardly extending lip 14 is formed along the forward edge of the frame 10 remote from the food receptacle 11.

This lip portion 14 provides a pivotable mounting on the frame for an actuator unit 15 which includes a flat pedal portion 16 and a pair of parallel arm portions 17 and 17′. A hinge of any type may be employed instead of the lip form shown, but this embodiment allows the unit to be readily assembled without the use of tools or other parts. The pedal portion 16 is disposed between the lip 14 and the forward edge portion 12 of the food receptacle 11. The arm portions 17–17′ extend from the pedal portion rearwardly to each side of and beyond the rearward edge portion 13 of the food receptacle 11. At the outer end the arm portions are formed with respective longitudinal slots 18–18′.

The device also includes a lid unit 19 formed on its underside with a pair of spaced grooves 20 into which extend respective cylindrical tongues 21 formed along the rearward edge portion 13 of the food receptacle 11, as shown most clearly in FIGS. 3 and 4. The grooves 20 receive the tongues 21 so as to serve as pivotable detachable hinges between the lid unit 19 and the frame. Again this particular form is chosen for ease of assembly and other types of hinges may serve as well, even a simple downwardly extending lip on the underside of the lid unit 19 just forward of the rearward edge portion 13 of the food receptacle 11.

A flat cover portion 22 is included in the lid unit and overlies and encloses the food receptacle when the lid unit is in the closed position shown in the drawings. It is preferably transparent so that the contents of the food receptacle are visible. Extending rearwardly beyond the rearward edge portion 13 of the food receptacle 11 is an end portion 23 of the lid unit. A pair of coaxial opposed trunnions 24 and 24′ extend outwardly from the rearwardmost edge of the end portion 23 in slideable contact with the respective slots 18 and 18′ in the arm portions 17–17′ of the actuator unit 15.

In the operation of the device, the pet food is placed in the receptacle 11 and the balance of the lid unit is such that it remains closed under the force of gravity to cover and enclose the contents of the receptacle. Suitable counterweights may be placed on the lid unit to insure that the cover portion is not overbalanced in the closed position so as to require an excessive initial opening force. Covering pet food in the manner prevents it from drying out and allows some canned and other pet foods to remain edible for as much as three days. This is particularly advantagous with cats since they eat frequently and large cans of cat food tend to spoil before being consumed, unless covered between use in the manner of the invention. Any unpleasant odor of such food is confined by the lid unit and insects and flies are kept from the contents. Spillage of food is also minimized.

It has been observed in the usage of the device that a cat attracted by food within the closed receptacle will learn quickly that access to the contents can be gained simply by stepping on the pedal portion 16. The principal purpose of the invention is to insure that the lid opens smoothly and easily when the pet steps on the pedal portion 16.

The downward force exerted on the pedal portion 16 causes the downwardly facing surface of the slots 18 and 18' to exert a lesser force on the upwardly facing surface of the trunnions 24 and 24'. This lesser force creates a turning moment on the lid unit 19 causing it to pivot about the tongue 21 in a clockwise direction as shown in FIG. 3. It is only necessary for the cover portion 22 of the lid unit to open to an angle of approximately forty-five degrees as shown in FIG. 3, well short of dead center, to permit the pet to have full access to the contents of the food receptacle 11.

The essential feature of the invention is that the point of sliding contact between the trunnions 24-24' and the slots 18-18' moves forwardly (to the left as shown in FIG. 3) as the lid unit swings from closed to open position. This forward movement of the point of sliding contact results in a decrease in the force necessary to operate the pedal 16 because of an increase in its resulting mechanical advantage. Put another way, a given force on the pedal 16 produces a greater turning moment on the lid unit 19 as the distance decreases from the pivotable mounting provided by the lip 14 out to the point of sliding contact between the slots 18-18' and the trunnions 24-24'.

The feeding device of the invention may be produced in fully assembled form or in a type of kit in which the few basic parts may be snapped together by hand. Variations of the pivotal connections will be apparent such as the lip 14 providing the pivotal mounting for the actuator unit, the tongue and groove providing the hinge for the lid unit, and the trunnions and slots interconnecting the actuator unit and the lid unit.

The scope of the present invention is set forth in the following claim rather than in the foregoing description of a preferred embodiment thereof.

I claim:

1. A pet-operated closeable feeding device comprising:
   (a) a frame;
   (b) an open food receptacle in fixed position on and integral with said frame and having forward and rearward edge portions;
   (c) an actuator unit pivotably mounted on said frame forward of the forward edge portion of said food receptacle comprising:
      i. a flat pedal portion disposed between the pivotable mounting of the actuator unit and the forward edge portion of said food receptacle, and
      ii. a pair of parallel arm portions extending from said pedal portion rearwardly to each side of and beyond the rearward edge portion of said food receptacle, each of said arm portions being formed with a longitudinal slot; and
   (d) a lid unit pivotably hinged to said frame adjacent the rearward edge portion of said food receptacle and comprising:
      i. a transparent flat cover portion adapted to overlie and enclose said food receptacle when said lid unit is in said closed position, and
      ii. an end portion extending rearwardly and including a pair of coaxial opposed trunnions extending outwardly in slideable contact with the respective slots in the actuator unit arm portions;
   (e) whereby a downward turning force on said pedal portion causes the lid unit cover portion to pivot upwardly to an open position while the point of sliding contact of the lid unit trunnions and the actuator unit arm portion slots moves forwardly toward the pivotable mounting of the actuator unit.

* * * * *